Feb. 6, 1934.  D. F. KUMPMAN ET AL  1,945,645
HOT AND COLD WATER MIXING VALVE
Filed March 3, 1930   3 Sheets-Sheet 2
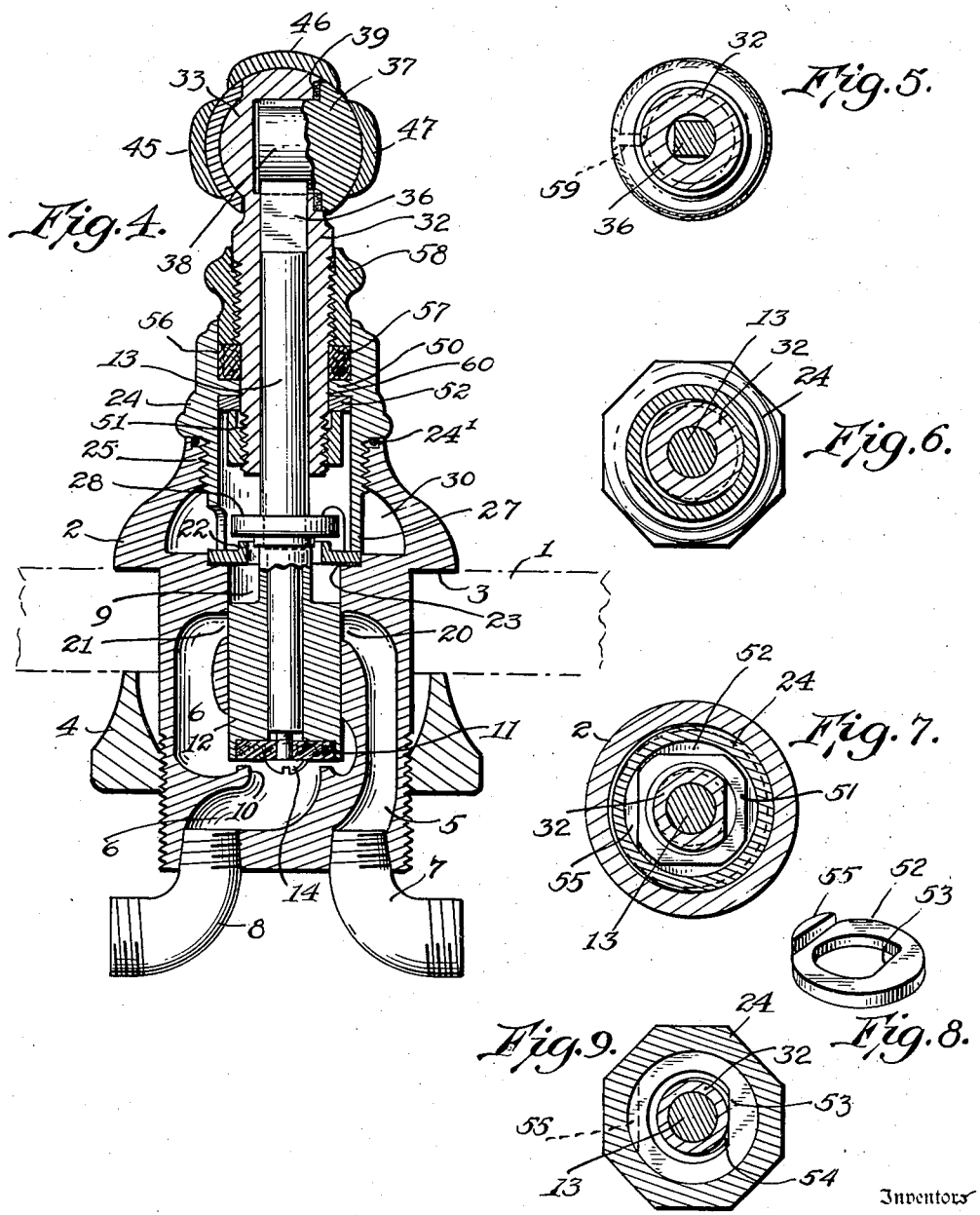
Inventors
Daniel F. Kumpman
John E. Kumpman
By Eccleston & Eccleston
Attorneys

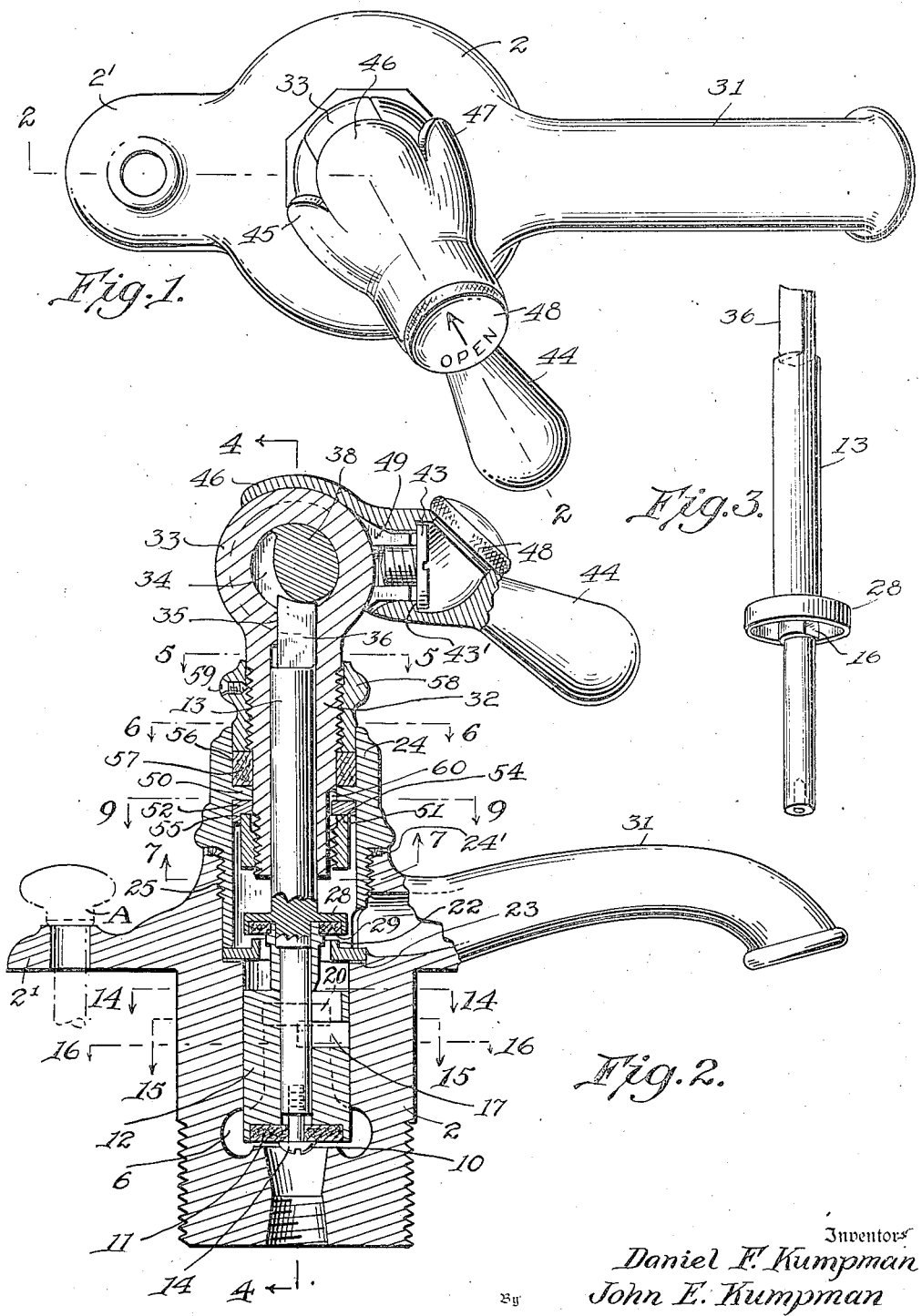

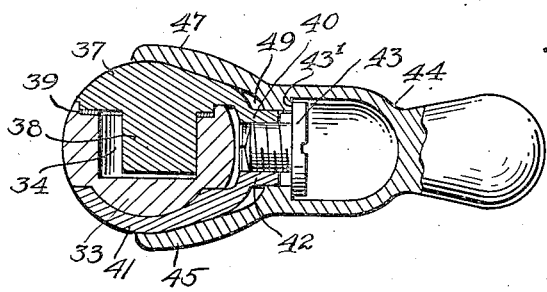
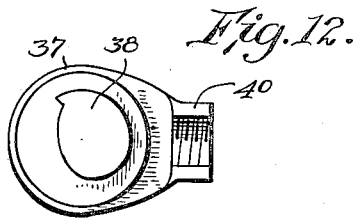
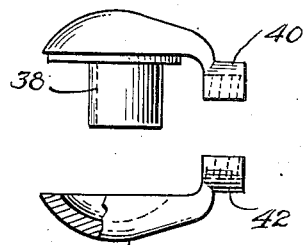
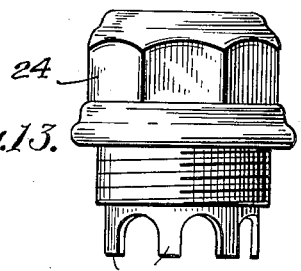
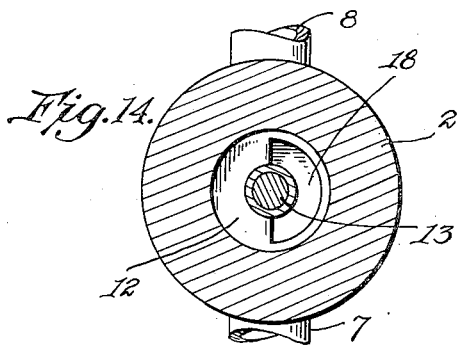
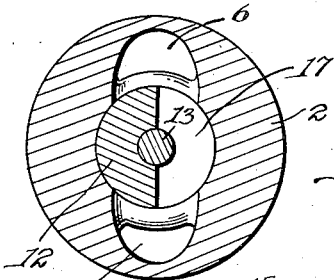
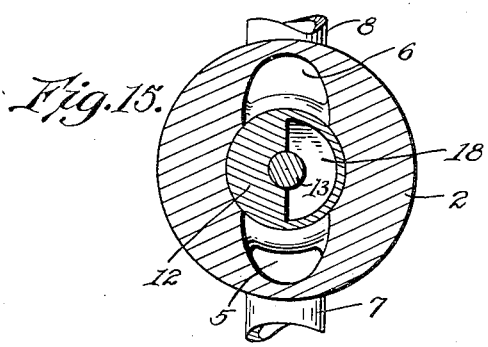
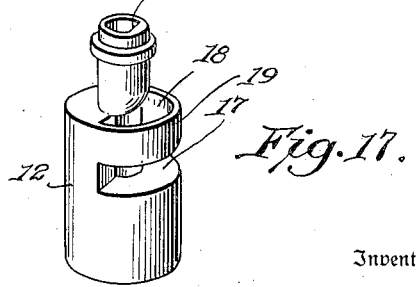

Patented Feb. 6, 1934

1,945,645

UNITED STATES PATENT OFFICE 1,945,645

HOT AND COLD WATER MIXING VALVE

Daniel F. Kumpman and John E. Kumpman, Dover, N. J.

Application March 3, 1930. Serial No. 432,835

11 Claims. (Cl. 277—22)

The present invention relates to a hot and cold water mixing valve for use on basins, lavatories, shower baths, or on any slab that may warrant its use; one of the main objects of the invention being to provide an improved valve construction which is readily operable by a single handle to regulate the mixture of the hot and cold water, and to control the volume of flow independently of the mixture. Numerous objects and advantages of the invention will be apparent, to those skilled in the art, from the following detailed description, taken in connection with the accompanying drawings, in which:

Figure 1 is a plan view of the mixing valve.

Figure 2 is a vertical sectional view taken on line 2—2 of Figure 1; but with the parts rotated to a different position than that indicated by the position of the handle in Figure 1.

Figure 3 is a perspective view of the valve stem with one of the valve heads formed integral therewith.

Figure 4 is a vertical sectional view taken on line 4—4 of Figure 2.

Figures 5, 6 and 7 are horizontal sectional views taken on lines 5—5, 6—6 and 7—7 of Figure 2.

Figure 8 is a perspective view of the lock washer.

Figure 9 is a horizontal sectional view taken on line 9—9 of Figure 2.

Figure 10 is a horizontal sectional view through the valve handle and related parts.

Figure 11 is a disassembled plan view of the operating cam and related parts.

Figure 12 is a side elevational view of the cam and its carrying member.

Figure 13 is a side elevational view of the valve bonnet.

Figures 14, 15 and 16 are horizontal sections taken on lines 14—14, 15—15, and 16—16 of Figure 2; and Figure 17 is a perspective view of the lower valve head.

Referring to the drawings in greater detail the numeral 1 indicates in dotted lines a portion of a basin, lavatory, the panel of a shower bath, or the like, in which the valve casing or body 2 is secured. The valve casing is provided with a conventional shoulder 3 which is adapted to be clamped to one face of the support as by means of a nut 4 which is threaded onto the inner or lower end of the valve casing. The casing is preferably provided with a rear extension 2' adapted to receive a spindle A for controlling the discharge from the basin or the like.

Before starting with the description of the valve construction, it will be helpful to refer very briefly to the general mode of operation. The volume flow of water is controlled and regulated by the reciprocable movement of the valve, which is effected by raising and lowering the handle. The temperature of the water is controlled, entirely independent of the volume, by turning the valve, by the handle, to the right or left. The volume being controlled by reciprocable movement of the valve, it is apparent that the supply can be shut off at any angular position of the valve; and likewise it can be opened at any angular position.

The valve casing or body is provided with two passages 5 and 6 at its lower end, the former for connection with a cold water pipe 7 and the latter for connection with the hot water pipe 8. The passage 5 is an uninterrupted one extending from the lower end of the casing and communicating at its upper end with the central bore 9 of the casing. The passage 6, however, for the hot water connection is provided with a valve seat 10 for cooperation with a washer 11 carried by the lower end of a valve head 12 which is fixed to the lower end of the valve stem 13 as by means of a screw 14. Relative rotary movement between the head 12 and the stem 13 is prevented by reason of the flattened portion 15 (Fig. 17) of the central opening of the valve head which cooperates with a similar flattened portion 16 (Fig. 3) formed on the stem. The special purpose of the valve seat 10 and washer 11 will be described hereinafter.

From an inspection of Figs. 14, 15, 16 and 17 it will be seen that the valve head 12 is provided with a substantially semi-circular cut-out portion 17 slightly above its vertical center and with a cut-out portion 18 communicating with the part 17 and leaving a semi-circular band 19 which, in conjunction with the opposite part of the head, provides a circular band for closing the upper ends of the passages 5 and 6 when the valve head is in its lowermost position with the washer 11 in sealing relation with respect to the valve seat 10. When, however, the valve head is raised as indicated in Figs. 2 and 4, the cut-out portion 17 will come into more or less complete registration with either or both of the exit openings 20 and 21 of the respective passages 5 and 6. In this connection it is to be noted, as will be more specifically pointed out hereinafter, that the valve spindle 13 and head 12 are oscillatable about their longitudinal axis as well as reciprocable, and it will thus be apparent that by reason of the construction of the head 12 as just described and the compound movements referred to, the valve may be operated to allow the discharge of either hot water, cold water, or a mixture of any proportion of both, and in any desired volume.

About midway of the length of the complete valve is provided a removable seat 22 which is mounted on the body portion thereof; a gasket 23 is disposed between the removable seat 22 and the body of the valve casing to provide a necessary seal, and the valve seat is pressed into sealing engagement with the valve body by means of a bonnet 24 which is threaded into the upper end of the valve body as indicated by the numeral 25, and has a plurality of fingers 27 which bear on the flange of the seat 22. A gasket 24' provides a seal between the bonnet and the body portion of the valve casing. The seat 22 is what might be termed the master seat of the valve inasmuch as it cooperates with a valve head 28 carried by the spindle 13, and serves to prevent the discharge of both hot and cold water when the head is moved to its lowermost position with its washer 29 in tight sealing contact with the seat. The lower valve seat 10 shuts off only the hot water, and its function is largely, as will appear hereinafter, to prevent any intermingling of the hot and cold water when the valve is shut; which intermingling might be due to a differential in the cold and hot water pressures, or otherwise.

Surrounding the seat 22, the casing 2 is provided with a mixing chamber 30, and communication between the central bore of the casing and the mixing chamber is afforded by reason of the spaces between the fingers 27 of the bonnet 24. Also communicating with the mixing chamber 30 is a nozzle 31, but it will be understood that this nozzle is merely shown as one form of discharging means from the valve, and it will be readily understood that the present mixing valve is intended for use also with shower baths, and the like. As has been stated, the master valve seat 22 is removably mounted in the casing and the purpose of this removable feature of the valve seat is to permit the ready assembling of the valve head 12 with the casing by insertion through the upper end of the casing, thereby avoiding the necessity of providing an assembling opening at the lower or inner end of the casing.

The valve stem 13 is reciprocably mounted within a cylindrical guide member 32 which terminates at its upper end in a head 33 provided with a circular opening 34 and a substantially rectangular opening 35 extending from the circular opening to the central cavity of the guide member in which the stem 13 is mounted. In this connection it is to be noted that the upper end of the valve stem 13 is provided with a squared portion 36 conforming to the cross-sectional shape of the opening 35, thereby causing the valve stem 13 to be rotated when the guide member 32 and its head 33 are rotated by the operating handle to be described.

From an inspection of Figs. 4 and 10 it will be noted that the head 33 is open at one side; the purpose being to mount thereon a plate 37 substantially symmetrical with the opposite side of the head 33 and having formed thereon a cam 38 which is designed to project into the circular opening 34 and cooperate with the upper end of the valve stem 13 to control the extent of upward movement of the valve stem and valve heads, and to force the valve heads into cooperation with their seats when so desired. A gasket or washer 39 is disposed between an annular seat on the head 33 and the plate 37, to provide a seal between these parts.

The plate 37 is provided with a substantially semi-circular extension 40, and a second plate 41 of more or less curved cross-sectional shape is applied to the head 33 on the side thereof opposite to the plate 37, and is also provided with a substantially semi-circular projection 42. These semi-circular projections 40 and 42 are provided with complementary threads on their inner surfaces for the reception of a bolt 43 for securing the handle 44 to the head. This handle, as indicated more clearly in Fig. 1, is provided with three slightly resilient fingers 45, 46 and 47, which, when the handle is applied to the valve, engage the outer surfaces of the plates 37 and 41 and the top of the head 33, thereby clamping these parts together. It is to be noted that the inner end of the handle 44 is hollow and is provided with a cap 48 adapted to close an opening in this portion of the handle and to bear certain indicia, such as "Open", "Closed", etc.

In assembling the handle with the head 33, the cap 48 is removed to permit the screwing up of the bolt 43, thereby drawing the fingers or jaws 45, 46 and 47 into clamping engagement with the related parts; the head of the bolt 43 abutting against a shoulder 43' formed in the handle. The cap 48 may be then screwed into position, as shown in Figs. 1 and 2.

By means of the construction described, it will be obvious that the handle may be raised or lowered in a pivotal movement around the head 33, thus raising the cam from engagement with the upper end of the stem 13 to a variable extent, and thus permitting the latter to rise by reason of the pressure of the water on the head 12; likewise the stem is depressed as the lobe of the cam is swung downwardly. It will also be obvious that through the medium of the flattened portion 36 of the stem and the squared opening 35 of the guide member 32, these two elements rotate together, so that the valve heads 12 and 28 are rotatable by appropriate lateral movement of the handle; the angular position of the valve head 12 determining whether hot or cold water, or a varying proportion of both, shall pass up through the bore 9 into the mixing chamber 30 and out through the nozzle 31. These movements of the handle will naturally cause some wear in the parts 33, 37 and 41, and in order to compensate for this wear of the parts, the inner contours of the jaws 45, 46 and 47 are such as to provide a space 49 between the base end of these jaws and the parts 33, 37 and 41, thereby permitting an adjustment of the screw bolt 43 from time to time to cause the jaws 45, 46 and 47 to more tightly grip the adjacent parts of the head and side plates.

As already intimated, the guide member 32 is rotatably mounted within the valve bonnet 24, and in order to lock the same against longitudinal movement within the casing, the bonnet is provided with an inwardly extending annular ledge 50. A nut 51 is threaded to the lower end of the tubular guide 32 for locking the same with respect to the ledge 50, and in order that this nut may be locked against loosening during the oscillatory movements of the tube, a lock washer 52 is disposed between the nut 51 and the ledge 50 of the bonnet. This lock washer 52 is shown in detail in Fig. 8 and is provided with a circular external periphery, while its internal periphery is partly circular and partly formed of a flattened portion 53. The flattened portion 53 of the lock washer cooperates with a flattened portion 54 (Fig. 9) formed on the lower external surface of the guide member 32 for locking the guide member and washer against relative rotary movement. The washer 52 is also provided with a downwardly projecting lug 55 (Figs. 2, 7, 8 and 9) for engaging one of the sides of the nut 51, whereby the nut is locked against relative movement with respect to the washer 52. By this means it is apparent that the nut 51 is securely locked against accidental loosening, which might otherwise be caused through the continued oscillation of the tube 32 in the operation of the valve.

The bonnet 24 is provided with a stuffing box portion 56 in which is mounted packing material 57, and a packing nut 58 is threaded onto the tubular guiding member 32 for the purpose of compacting this material. A set screw 59 (Fig. 2) serves to secure this packing nut against loosening.

In the assembling of the valve, the guide member 32 and bonnet are assembled prior to the insertion of the valve stem 13 and the application of the bonnet to the valve casing 2. In order to clamp the guide member 32 in the bonnet, a nut 51 is threaded on the lower end thereof. As previously described, the nut is locked against accidental loosening by lock washer 52 having a depending lug 55. In assembling the nut 51 and washer 52, the nut is screwed up as far as possible, and the guide member is then lifted to move the nut vertically into cooperative relation with the lug 55. In disassembling these two elements, the packing nut 58 is backed up sufficiently to permit the guide member to be pushed downwardly to release the nut 51 from the lug 55; the cut-out portion 60 permitting this downward movement.

As already mentioned, the valve heads are lowered by the rotation of the cam 38, and are raised by the pressure of the water on the head 12, when the cam 38 is moved into such position as to allow an upward movement of the valve stem 13. As the valve stem is raised the gasket 11 is lifted from its seat 10, thereby allowing hot water to pass through the passage 6 up to the port 21; it being understood that the cold water is present at all times in the passage 5. If the valve stem is in its neutral position when raised, the hot and cold water will pass through the ports 20 and 21 in equal proportion as will be obvious from an inspection of the relation of the passages and port 17 of the valve head 12. If, however, the valve stem and the head 12 fixed thereto is rotated to its limit in either direction one of the ports 20, 21, will be completely closed and the other completely opened. Likewise, if the valve stem is rotated to any degree from its neutral position the amounts of hot and cold water passing through the ports 20 and 21 will be varied proportionately. Moreover, the extent of vertical movement of the valve head 12 will vary the vertical dimension of the opening of ports 20 or 21. If one of the ports is entirely shut off then the vertical movement of the valve head will vary only the vertical dimension of the other port; if both of the ports are partly open, then the vertical movement of the valve head will vary the vertical dimension of both ports, but to the same extent; the result being that whatever the angular position of the valve head, the vertical movement thereof varies only the volume of flow, without any effect on the temperature.

The valve seat 10 and its washer 11 in the hot water passage 6, provide a control for this passage supplemental to the control of the master valve head 28. This additional control of the hot water passage is desirable to prevent any intermingling of the hot and cold water when the valve is shut off. There is often a differential in pressure between the hot and cold water systems, and under such circumstances the water of the system having the higher pressure would be forced into the system having the lower pressure, if it were not for this supplemental valve seat. And even if there was not a differential in pressure there would be a tendency for the water of the two systems to intermingle, so that this supplemental valve seat is highly desirable under all conditions.

The operation of the several features of the invention have been described in connection with the description of the various parts of the valve structure and only a general description of the valve operation insofar as the direct control of the water is concerned is necessary. If the handle is moved downwardly to its lower limit the valve heads will be forced into closed position on their respective seats by the action of the cam against the upper end of valve stem 13. This closing action of the valve heads takes place irrespective of the angular position of the handle 44 in a horizontal plane. If now the handle is raised slightly the cam 38 will be rotated an equal amount and thereby allow the valve stem 13 to be raised an equivalent amount by the water pressure on the head 12. The extent of the vertical movement of valve head 12 will regulate the volume of water discharging through the valve per unit of time, but this movement of the valve head does not control the proportion of hot or cold water or mixture thereof passing through the valve. If, however, the handle 44 is now moved to the right or left (Fig. 1) the volume of water discharging will remain unchanged but it can be varied from all hot to all cold water or to any desired intermediate temperature.

If the handle is in such a position as to allow the discharge of a certain volume of cold water and is then swung downwardly so as to seat the valve heads 12 and 28 the flow of water will be shut off. Should the handle then be raised again without imparting any lateral movement thereto cold water will again discharge through the valve in a volume commensurate with the extent of vertical movement of the handle. If the handle is in raised position and in the vertical plane of the nozzle 31 so that equal proportions of hot and cold water are discharging, the discharge will be cut off when the handle is moved to its lower limit. If the handle is now raised without imparting any lateral movement thereto equal proportions of hot and cold water will again discharge through the device. The volume, of course, depending upon the extent of the upward movement of the handle. The same is true, of course, for any lateral position of the handle. It may be shut off or opened in any lateral position.

From the foregoing description, taken in connection with the accompanying drawings, it will be apparent to those skilled in the art that we have devised a novel, efficient, and simple type of hot and cold water mixing valve, in which the operation of a single handle serves to control the discharge of either hot or cold water or any proportional mixture thereof, and also controls the volume of flow independently of the nature of the discharge, whether hot or cold or any mixture thereof.

What we claim as new and desire to secure by Letters Patent is:

1. A mixing valve, including hot and cold water passages, a valve stem, two valve heads on said stem, a valve seat with which one of said valve heads cooperates to shut off the hot water, and a second valve seat with which the other of said valve heads cooperates to shut off both hot and cold water, and means for controlling the mixture of hot and cold water independently of the volume.

2. A mixing valve, including hot and cold water passages, a valve stem, a valve head on the valve stem, a cam cooperating with the valve stem, the water pressure lifting said valve head and stem when the cam releases the stem, and means to rotate the valve head to vary the proportionate flow of hot and cold water.

3. A mixing valve, including hot and cold water passages, a valve stem, a valve head on the valve stem, a cam cooperating with the valve stem, said valve head being continuously subjected to water pressure tending to lift the valve head and stem, said cam controlling the lifting of the valve head and stem, and means to rotate the valve head to vary the proportionate flow of hot and cold water.

4. A mixing valve, including hot and cold water passages, a valve stem, a valve head integral with the valve stem, a valve head removably mounted on the valve stem, means permitting the simultaneous lifting of both valve heads by water pressure to permit the flow of water, and means for rotating the second mentioned valve head thereby regulating the mixture of hot and cold water.

5. A mixing valve, including a valve casing, a valve seat formed integral therewith, a valve seat removably mounted in said casing, a valve bonnet mounted on the casing and holding the removable valve seat in place, a valve stem, valve heads carried by the stem and cooperating with the valve seats, one of said valve heads being continuously subjected to water pressure tending to lift it, and a handle for controlling the rotation and longitudinal movement of said valve stem.

6. A mixing valve, including a valve casing, a valve seat in said casing, a second valve seat removably mounted in said casing, a valve bonnet securing the removable seat in place, a guide member mounted in the bonnet, a valve stem carrying valve heads cooperating with the valve seats, one of said valve heads being continuously subjected to water pressure tending to lift it, said valve stem being mounted in said guide member and being longitudinally movable with respect thereto and rotatable therewith.

7. A mixing valve, including a valve casing having hot and cold water passages, a valve head mounted therein and controlling the mixture of the hot and cold water and the volume of flow independently of the mixture, a valve bonnet attached to the casing, a guide member mounted in the bonnet, a valve stem mounted in the guide member and carrying the valve head, said valve stem and guide member being rotatable together, said valve stem being longitudinally movable relative to the guide member, said valve head being continuously subjected to water pressure tending to lift it, a cam cooperating with and controlling the longitudinal movement of the valve stem, and a single handle for operating said cam and for rotating the guide member and valve stem.

8. A mixing valve, including a valve casing having hot and cold water passages, a valve head controlling said passages, a rotatable guide member attached to the valve casing, a valve stem for operating the valve head and mounted in said guide member, the guide member and valve stem being rotatable together, a handle to rotate the guide member, said valve head being continuously subjected to water pressure tending to lift it, a cam mounted in the guide member and controlling the longitudinal movement of the valve stem relative to the guide member, the cam being operated by the same handle as the guide member.

9. A mixing valve, a cam for operating the mixing valve, a member in which the cam is mounted, a handle for operating the cam, clamping fingers provided on said handle and clamping together the member and the cam.

10. A mixing valve, a cam for operating the mixing valve, a member in which the cam is mounted, a handle for operating the cam, clamping fingers provided on said handle and clamping together the member and the cam, and means for adjusting the clamping action of said fingers.

11. A mixing valve, a cam for operating the mixing valve, a handle, clamping fingers on said handle for clamping the cam in place, a screw for drawing the handle and clamping fingers into place, a shoulder formed in the interior of the handle and against which the head of the screw abuts, whereby rotation of the screw adjusts the clamping action of the fingers.

DANIEL F. KUMPMAN.
JOHN E. KUMPMAN.